(12) United States Patent
Charters et al.

(10) Patent No.: US 9,189,219 B2
(45) Date of Patent: Nov. 17, 2015

(54) DECIDING WHETHER TO INSTALL A FIRST APPLICATION WITHIN ONE OF A PLURALITY OF CANDIDATE ENVIRONMENTS

(75) Inventors: Graham C. Charters, Southampton (GB); Jeremy P. J. Hughes, Winchester (GB); Alasdair Nottingham, Southampton (GB); Ian Robinson, Southampton (GB); Timothy J. Ward, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 13/515,255

(22) PCT Filed: Nov. 25, 2010

(86) PCT No.: PCT/EP2010/068211
§ 371 (c)(1),
(2), (4) Date: Oct. 3, 2012

(87) PCT Pub. No.: WO2011/069834
PCT Pub. Date: Jun. 16, 2011

(65) Prior Publication Data
US 2013/0061217 A1    Mar. 7, 2013

(30) Foreign Application Priority Data

Dec. 11, 2009 (EP) .................................... 09178804

(51) Int. Cl.
*G06F 9/445*   (2006.01)

(52) U.S. Cl.
CPC ... *G06F 8/61* (2013.01); *G06F 8/60* (2013.01)

(58) Field of Classification Search
None
See application file for complete search history.

(56) References Cited

U.S. PATENT DOCUMENTS

| 7,222,138 B2 | 5/2007 | Fomenko |
| 7,322,025 B2 | 1/2008 | Reddy et al. |
| 7,484,223 B2 | 1/2009 | Hill et al. |

(Continued)

FOREIGN PATENT DOCUMENTS

| CN | 101000552 A | 7/2007 |
| EP | 2113839 A1 | 11/2009 |

(Continued)

OTHER PUBLICATIONS

Bartlett, Neil, "OSGi In Practice", Jan. 11, 2009, 229 pages.

(Continued)

*Primary Examiner* — Jason Mitchell
*Assistant Examiner* — Mark Gooray
(74) *Attorney, Agent, or Firm* — Francis Lammes; Stephen J. Walder, Jr.; Parashos T. Kalaitzis

(57) ABSTRACT

A mechanism is provided for deciding whether to install a first application within one of a plurality of candidate environments. An environment comprising one or more other applications. The first application and a candidate environment are analyzed to determine whether there is the potential for the first application to interact in an unintended manner with an application in the candidate environment. If there is no such potential, then the environment is identified as a suitable environment into which to install the first application. An unintended interaction is when a rule would be broken by an interaction between the first application and an application in the candidate environment.

25 Claims, 4 Drawing Sheets

(56) References Cited

U.S. PATENT DOCUMENTS

| | | | |
|---|---|---|---|
| 2005/0108703 A1* | 5/2005 | Hellier | 717/174 |
| 2005/0177826 A1 | 8/2005 | Miller et al. | |
| 2005/0193119 A1 | 9/2005 | Hayes, Jr. | |
| 2005/0223101 A1* | 10/2005 | Hayes, Jr. | 709/228 |
| 2007/0006218 A1* | 1/2007 | Vinberg et al. | 717/174 |
| 2007/0220507 A1 | 9/2007 | Back et al. | |
| 2008/0222626 A1* | 9/2008 | Kumar Hirsave et al. | 717/168 |
| 2009/0094596 A1 | 4/2009 | Kuiper et al. | |

FOREIGN PATENT DOCUMENTS

| | | |
|---|---|---|
| EP | 2184903 A1 | 5/2010 |
| GB | 2465785 A | 6/2010 |
| WO | WO2006114677 A2 | 11/2006 |

OTHER PUBLICATIONS

Bartlett, Neil, "Getting Started with OSGi: Dependencies between Bundles", EclipseZone, http://www.eclipsezone.com/eclipse/forums/t90544.html, XP-002628847, Feb. 12, 2007, 11 pages.

Bartlett, Neil, "OSGi In Practice", http://s3.amazonaws.com/neilbartlett.name/osgibook_preview_20090110.pdf, Jan. 11, 2009, 229 pages.

Bures, Tomas et al., "Runtime Support for Advanced Component Concepts", Proceedings of the 5th International Conference on Software Engineering Research, Management and Applications, 2007, pp. 337-345.

Cervantes, Humberto et al., "Beanome: A Component Model for the ISGi Framework", http://148.206.49.174/papers/VIVIAN2002.pdf, Software Infrastructures for Component-Based Application on Consumer Devices, Sep. 2002, 10 pages.

Ottinger, Joseph, "ISGi for Beginners", http://www.theserverside.com/news/1363825/OSGi-for-Beginners, XP-002628848, May 1, 2008, 18 pages.

Zhou, Gongjian et al., "A Component Based Approach for the Embedded Software Evolution", Proceedings of the 8th International Conference on Computer Supported Cooperative Work in Design, 2003, pp. 701-706.

* cited by examiner

DECIDING WHETHER TO INSTALL A FIRST APPLICATION WITHIN ONE OF A PLURALITY OF CANDIDATE ENVIRONMENTS

BACKGROUND

The invention relates to installation of applications.

The OSGi Alliance is a standards organisation that defines a dynamic module framework for Java™. (Java and all Java-based trademarks and logos are trademarks of Sun Microsystems, Inc. in the United States, other countries, or both.)

The unit of modularity defined by OSGi is an OSGi "bundle," which is a jar archive containing OSGi metadata as additional headers in a jar manifest. The concept of an "application" comprised of multiple bundles is not standardized yet in OSGi, but technologies such as Spring dm Server and Apache Aries have defined an application as a collection of OSGi bundles (code modules). In order to reduce memory and CPU usage, multiple applications may run in a single OSGi framework instance. Such applications may specify dependencies on other bundles, packages or services.

The examples provided herein will be given with respect to package dependencies. This is for ease of explanation only and it should be appreciated that they apply equally to other kinds of dependencies such as bundles and services.

An application is intended to provide an isolation boundary such that the application internals cannot be seen from the outside. It is important, therefore, that applications within the same framework instance do not expose packages exported by their bundles to other applications unless the providing application chooses to export the package. For example, an application X contains bundle A and an application Y contains bundle B. Bundle A exports a package Q, whilst bundle B specifies an import for package Q. Package Q is not however intended to be used outside application X. Therefore, application X does not specify an export for that package. It is however necessary to provide additional support to prevent packages from being unintentionally shared across applications. Possible solutions and their drawbacks will be described subsequently.

An additional consideration is that applications may specify version level constraints. For example, application X may include a bundle A which imports package Q in the range 1.0 to 1.5. Bundle B, within the same application, exports package Q at version 1.2. However, application Y (running alongside X) contains a bundle C which exports package Q at version 1.3. In the absence of any application isolation, bundle A will typically use the most up to date version of package Q matching its import range and would therefore use the package from bundle C.

For application X to make use of application Y's package at version 1.3 may not however be desirable. Each application has been tested and quality assured using specific bundles and packages. Even though bundle A has specified a range that it supports, it may not have actually been tested for all versions within the range; rather there may be a long term plan to eventually test "A" with all versions within the supported range.

In a plain Java Virtual Machine (JVM), with a single global classpath, it is not possible to run multiple versions of the same Java class side by side. This is because the JVM will simply use the first version it finds on the classpath. OSGi enables this by having a distinct classpath and class loader for each bundle. Each bundle can then contain a different version of the same class and bundles can express a dependency on a specific package version (and therefore class version).

In less modular systems than one conforming to the OSGi standard, the opportunities to solve this type of problem are more limited. For example, it is known when downloading firmware levels onto communicating nodes that if a node already has a higher level of firmware than the level that is to be installed on that node, then the installation will not take place. Additionally, it is known in AIX® packaging for an install process to look for dependencies between patches being applied to AIX. If there is a conflict, then a sufficient number of patches are installed to enable the system to work. It is also known when installing IBM® WebSphere® Application Server applications onto a mixed-version cell (an administrative cell containing WebSphere Application Server nodes at different versions, that an application will be installed only onto those WebSphere Application Server nodes that support the requirements of that application (in other words, node(s) at the correct version). (IBM, WebSphere and AIX are trademarks or registered trademarks of International Business Machines Corporation in the United States, other countries, or both.)

The OSGi environment presents a different set of expectations which result in problems of their own.

Spring dm Server uses a single framework instance and relies on the system adding naming conventions to any bundle, package and service dependencies at runtime to isolate applications. This approach is not ideal since any user who knows the convention can easily gain access to the application internals.

The concept of nesting an OSGi framework within another framework is being standardized in the OSGi Alliance as a means for isolating internal middleware capabilities from applications (so applications do not have access to middleware internals).

Nested frameworks are also being seen as a possible mechanism for isolating applications from each other. Each application would be deployed into its own nested framework and therefore have its own package resolution scope. This solution is ideal from the perspective of providing application isolation but in cases where there are tens or hundreds of applications it has the potential to cause significant scalability issues. Additionally each framework instance has an associated cost (memory, CPU etc).

SUMMARY

According to a first aspect, there is provided a method for deciding whether to install a first application within one of a plurality of candidate environments, an environment comprising one or more other applications, the method comprising: analysing the first application and a candidate environment to determine whether there is the potential for the first application to interact in an unintended manner with an application in the candidate environment; and responsive to determining that there is no potential for an unintended interaction, identifying the environment as a suitable environment into which to install the first application, wherein one or more applications are associated with one or more rules that specify at least one of: an entity that is to be used within that application (e.g. an internal import or export); an entity that is provided by the application but may be used outside of that application (e.g. an external export); and an entity that is to be procured from outside of the application (e.g. an external import), and wherein an unintended interaction is when a rule would be broken by an interaction between the first application and an application in the candidate environment.

The first application may then be installed into the environment (or any other environment subsequently identified as suitable.) Alternatively, a number of suitable environments may be identified before one is chosen. The choice may be made based on any number of criteria. For example, a suitable environment containing the least number of applications.

In a preferred embodiment, the interaction is only potential because, whilst an interaction could validly occur, there may be other reasons such as co-dependencies or timing reasons (e.g. installation ordering) as to why an interaction would not actually occur. In the OSGi environment, for example, it is typically a resolver that will determine whether an interaction will actually occur.

Example entities are packages, services, models and schemas.

As alluded to previously, in OSGi, for example, interaction between entities is generally expected because the concept of an application as a set of bundles was not defined. Certain technologies have however defined their own concept of an application and each application is intended to provide an isolation boundary. Up to now, achieving this has proved problematic.

In one embodiment, the step of analysing the first application and the candidate environment involves identifying, if any, an import or an export defined by the first application.

If it is determined that there is the potential for an unintended interaction, another candidate environment is preferably analysed to determine whether there is the potential for the first application to interact in an unintended manner with an application in the other candidate environment.

This preferably involves analysing at least a part of the first application and at least a part of at least one application in the candidate environment.

In other words, it would be possible to do a complete analysis before concluding that there is the potential for an unintended interaction. Alternatively, if only part of the first application and part of an application with the candidate environment is analysed and this yields an indication that there is the potential for an unintended interaction, then this may be good enough.

It may equally be possible to only analyse a part of an application within the other candidate environment. If it is determined that there is no potential for an unintended interaction between the first application and any application in the other candidate environment, then the first application is preferably identified as a suitable environment into which to install the first application.

In accordance with a preferred embodiment, having analysed all candidate environments without having identified an environment in which there is no potential for the first application to interact in an unintended manner with any applications in those candidate environments, a new environment is created and the first application is installed therein.

The analysis of the other candidate environment comprises, in accordance with one embodiment, identifying, if any, an import or export defined by an application within the other candidate environment.

In one embodiment, an application specifies one or more criteria with respect to at least one of: any entities that are to be used within the application; any entities that are provided by the application but may be used outside of that application; and any entities that are to be procured from outside of the application.

This may comprise, for example, versions or version ranges. For example, one application may an import of an entity in the range 1.3 to 1.5.

In a preferred embodiment information with respect to analysis performed is cached for later retrieval. This might be useful, for example, when the first application has been installed into an environment and a new application is being compared against the first application.

According to a second aspect, there is provided an apparatus for deciding whether to install a first application within one of a plurality of candidate environments, an environment comprising one or more other applications, the apparatus comprising: a component for analysing the first application and a candidate environment to determine whether there is the potential for the first application to interact in an unintended manner with an application in the candidate environment; and a component, responsive to determining that there is no potential for an unintended interaction, for identifying the environment as a suitable environment into which to install the first application, wherein one or more applications are associated with one or more rules that specify at least one of: an entity that is to be used within that application; an entity that is provided by the application but may be used outside of that application; and an entity that is to be procured from outside of the application, and wherein an unintended interaction is when a rule would be broken by an interaction between the first application and an application in the candidate environment.

According to a third aspect, there is provided a computer program for deciding whether to install a first application within one of a plurality of candidate environments, an environment comprising one or more other applications. The computer program operable to perform the following method steps when the program is run on a computer: analysing the first application and a candidate environment to determine whether there is the potential for the first application to interact in an unintended manner with an application in the candidate environment; and responsive to determining that there is no potential for an unintended interaction, identifying the environment as a suitable environment into which to install the first application, wherein one or more applications are associated with one or more rules that specify at least one of: an entity that is to be used within that application; an entity that is provided by the application but may be used outside of that application; and an entity that is to be procured from outside of the application, and wherein an unintended interaction is when a rule would be broken by an interaction between the first application and an application in the candidate environment.

BRIEF DESCRIPTION OF THE SEVERAL VIEWS OF THE DRAWINGS

A preferred embodiment of the present invention will now be described, by way of example only, and with reference to the following drawings.

DETAILED DESCRIPTION

Figure 1:
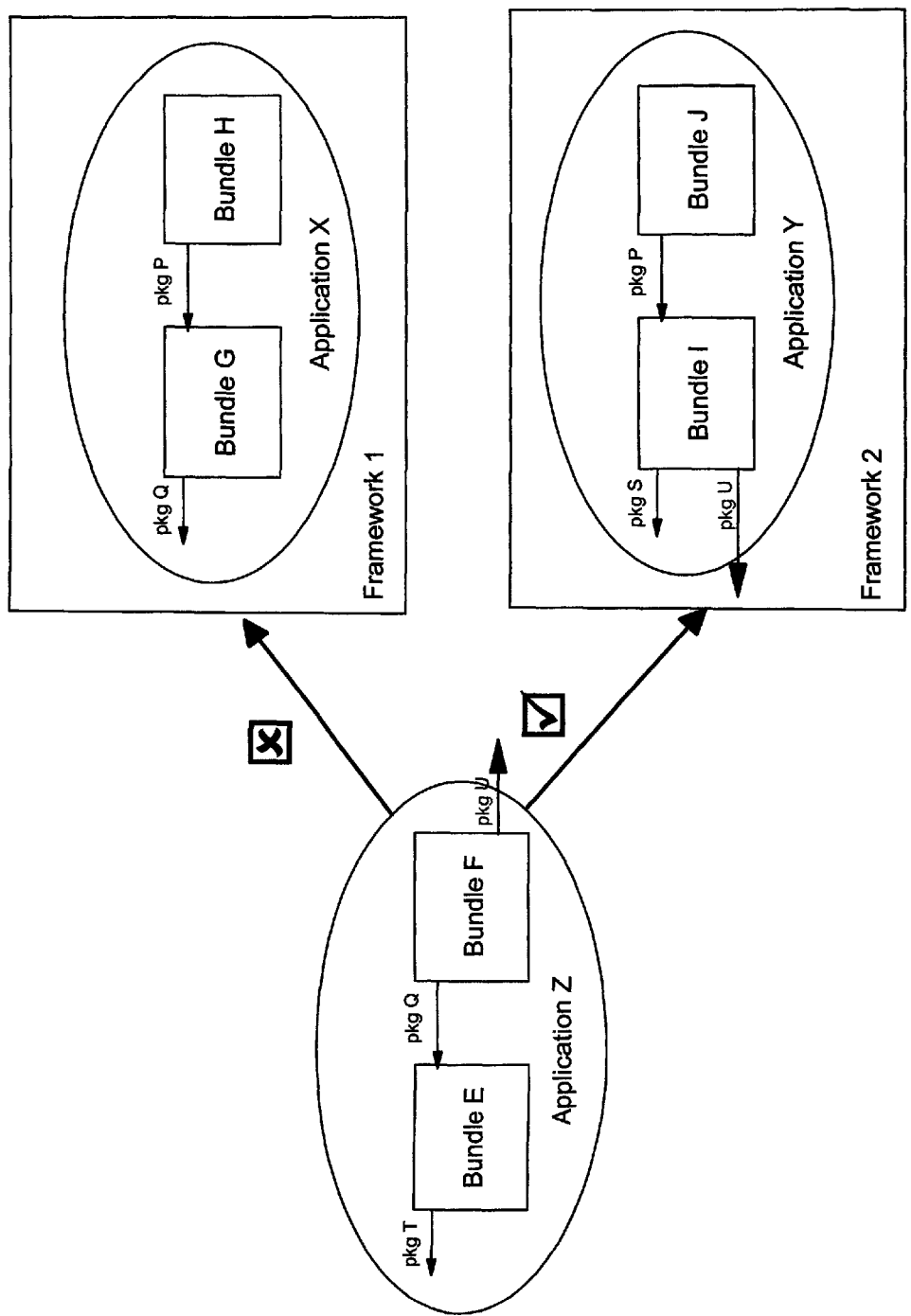
FIG. 1 illustrates an exemplary system in which the present invention may operate.

As shown in FIG. 1, application Z comprises two bundles E and F. Bundle E exports package T and has a dependency on package Q. Bundle F exports package Q which is imported by bundle E. Packages T and Q are exported for use internally within application Z. Package Q is imported internally. Package U is shown by an arrow which extends beyond application Z. This is to indicate that package U is intentionally exported externally by application Z. Externally exported packages are those which an application chooses to make available for use by other applications. This may be indicated via metadata associated with the particular application; for example using an application manifest. Packages which are exported externally by an application can also be used internally within that application. Although this is not shown by the figure, an application may also choose to import a package from outside the application. Such packages could then be satisfied by those externally exported by other applications.

It should be appreciated that whilst a particular bundle may import a package, another bundle or a service, that package, bundle or service is also available for import by any other bundle. Whilst the term package tends to be used throughout, this is by way of example only.

Application Z needs to be installed in either of framework 1 or framework 2 or, if this isn't possible due to potential conflicts, another new framework 3 (not shown). Framework 1 includes application X. Application X has two bundles. Bundle G exports package Q and is dependent upon package P. Bundle H exports package P which is imported by bundle G. Packages P and Q are exported for use internally within application X. Package P is imported internally.

Framework 2 includes application Y which has two bundles I and J. Bundle I exports package S and is dependent upon package P. Bundle J exports package P which is imported by bundle I. Packages P and S are exported for use internally within application Y. Package U is exported externally by application Y.

Figure 2:
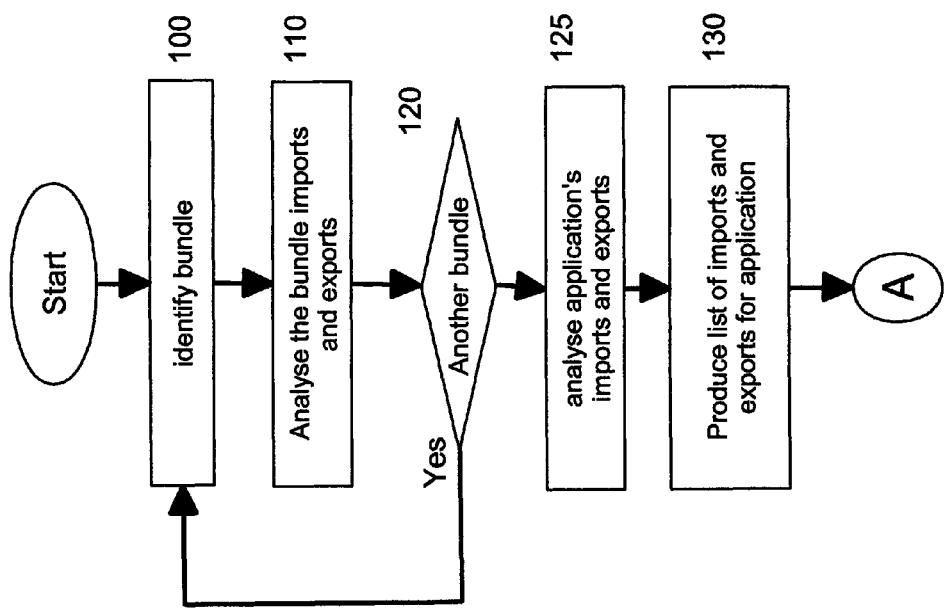
FIG. 2 is a flow chart of the processing performed, in accordance with a preferred embodiment of the present invention, with respect to the application to be installed.
Figure 3:
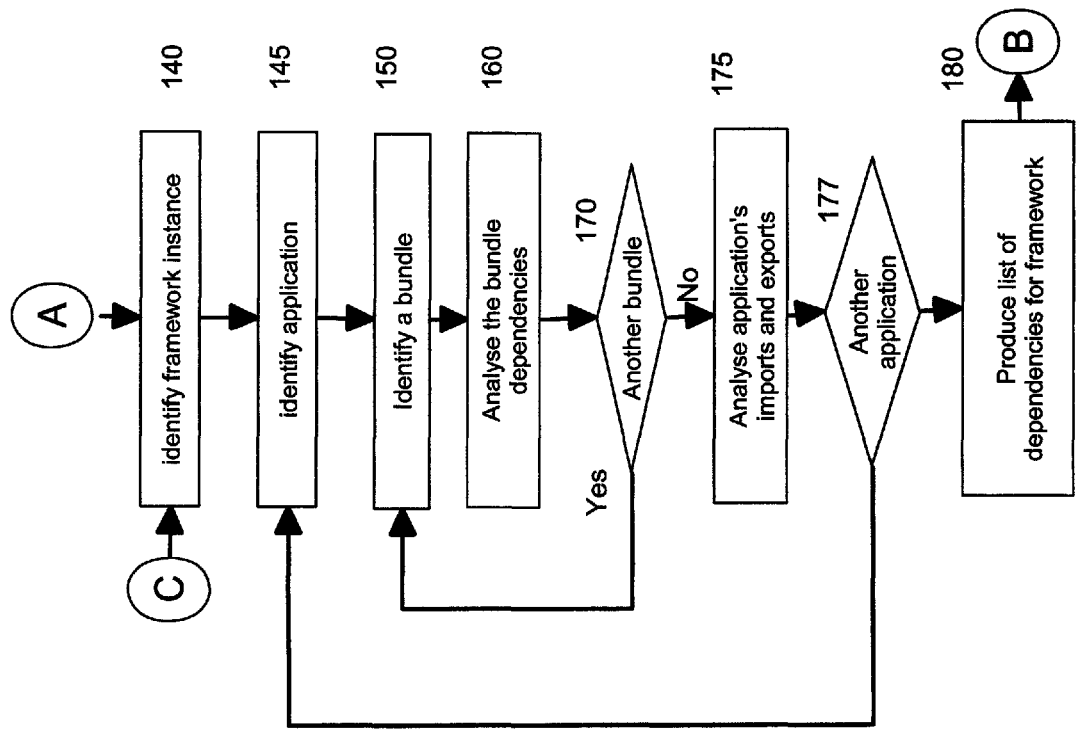
FIGS. 3 and 4 are flow charts of the processing performed, in accordance with a preferred embodiment of the present invention, with respect to a candidate framework instance.
Figure 4:
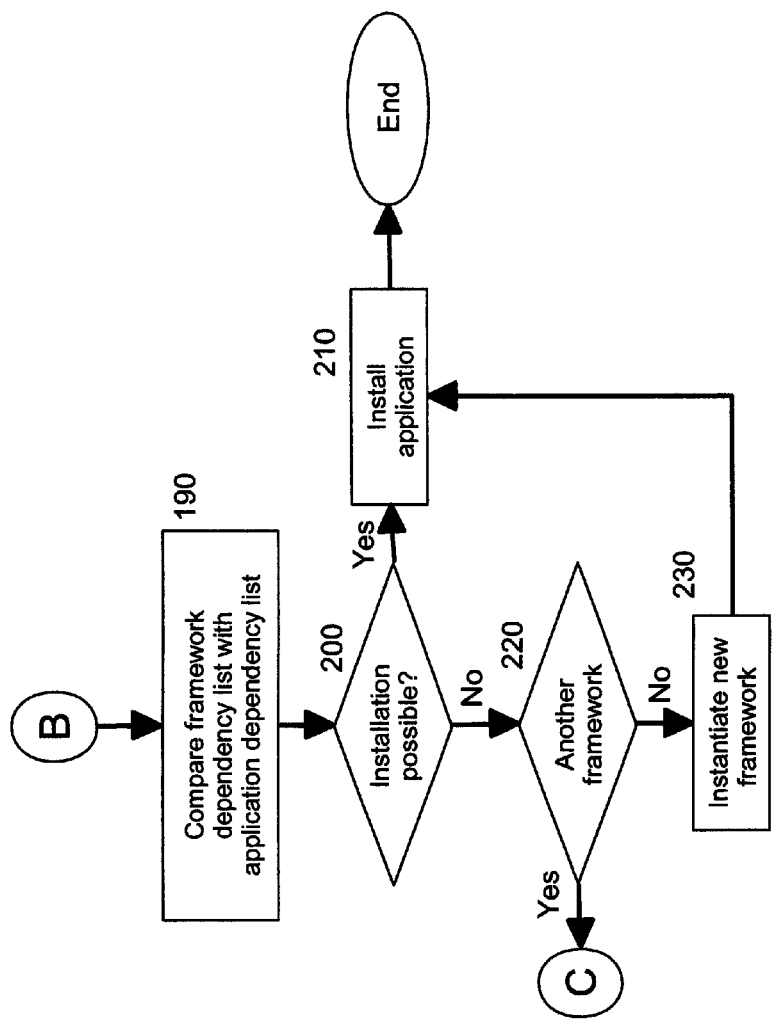

FIGS. 2, 3 and 4 illustrate the processing that is carried out in order to determine which framework is an appropriate framework in which to install application Z.

With reference first to FIG. 2, a bundle within the application to be installed is identified (step 100); e.g. bundle E. At step 110, bundle E's imports and exports (dependencies of the bundle) are analysed. For example, it is determined that bundle E exports package T and imports package Q. Bundles specify their imports and exports in metadata associated with those bundles; for example using manifests.

At step 120, it is determined whether the application (e.g. application Z) comprises another bundle. In this example, the answer is yes and processing loops round to identify that bundle as bundle F (step 100). At step 110, bundle F's imports and exports (dependencies) are analysed to determine that bundle F exports package Q.

At step 120, it is determined that application Z does not contain any other bundles. At step 125, the application's external imports and exports (dependencies) are analysed. As indicated above, an application may explicitly make packages available to other applications. Equally an application may specify that it is able to use packages from outside of itself. Such explicit imports and exports are identified using metadata (not shown) associated with the application; for example in a manifest. In FIG. 1, package U is exported externally by application Z.

At step 130 a complete list of exports and imports (dependencies) for the application is produced. In this example, the application's internal dependencies are on packages Q and T and package U is exported externally.

Note, the list should specify whether particular packages are imported or exported and whether they are internal or external. For example, if one application's bundle internally imports package Q and another application's bundle also internally imports package Q, there will be no conflict.

FIGS. 3 and 4 then illustrate the processing involved to determine the dependencies (imports and exports) of any applications within a candidate framework instance. A candidate framework is a framework instance into which application Z could possibly be installed.

At step 140, a framework instance is identified (framework 1). At step 145 an application (logical set of bundles) is identified (application X). A bundle G within the identified application is then identified (step 150) and bundle G's dependencies are then analysed at step 160. In this example, bundle G exports package Q and imports package P. These are internal imports and exports and they are discovered using bundle G's manifest. It is then determined at step 170 whether framework 1 contains any other bundles. In this instance there is another bundle so processing loops round to identify bundle H at step 150. Bundle H's dependencies are analysed (step 160) to identify that H exports package P.

It is determined at step 170 that framework 1 does not contain any additional bundles.

At step 175 the application's imports and exports are analysed. This is discovered from the application's manifest (not shown) and this manifest indicates which packages the application chooses to make available externally and also whether an application is able to use a package from outside of itself. In this instance there are no external exports or imports shown for application X. For an example of an external export, see application Y which chooses to make package U available externally.

It is then determined at step 177 whether the current framework instance comprises another application. If it does, then processing loops round to step 145.

If there are no additional applications, then a list of framework 1's imports and exports on a per application basis is produced at step 180. In this example, packages P and Q are identified. Note, again it is preferably specified whether each listed package is imported or exported and also whether they are internal or external with respect to the application. Finally, whilst package imports and exports are shown, bundles and/or services may also be imported or exported.

It should of course be appreciated that other algorithms for determining the various application dependencies are possible and one has been given by way of example only. This example has been chosen for ease of explanation. Other possible optimisations will be discussed later.

With reference to FIG. 4 now, a comparison is performed of the framework dependency list with the application dependency list (step 190). It is then determined at step 200 whether installation into the current framework is possible (desirable).

If installation is possible, then the application is installed into the current framework at step 210 and processing ends.

If installation is not possible, then it is determined whether there is another candidate framework instance at step 220. If there is, then processing moves to step 140, FIG. 3 and the appropriate analysis is performed to determine whether this other framework is appropriate for installation of the application.

If on the other hand it is determined that the last available framework has been analysed and an appropriate framework hasn't been found, then a new framework is instantiated at step 230 and the application is installed into this newly instantiated framework.

Of course it would be possible to analyse all candidate frameworks and to mark each one as appropriate or inappropriate. A framework could then be selected from the ones marked as appropriate.

Having explained the basic processing, step 190 will now be explained in more detail.

As indicated previously, it is important that applications within a framework instance do not interact with each other's internal packages. Thus one application should generally not import a package, bundle or service from another application. Thus the comparison step at 190 is used to determine whether there is likely to be any such non-isolated (i.e. undesirable) interaction between application Z and application X. Any time there is a match between an internal dependency listed by application Z and an internal package provided by application X (or vice versa), then it is generally determined at step 200 that installation is not possible.

It should be appreciated that if there is a package which one application specifies that it is acceptable to get from an external location (import), then it is not permissible to make use of another application's packages which are only intended for internal use. Similarly, if there is a package which one application makes externally available (exports), then it is not permissible for another application to pick up the package unless that other application explicitly specifies that this is acceptable.

If one application indicates that it chooses to export the same package externally whilst the other application indicates that it chooses to import the package from outside the application, then this is acceptable. In this instance, installation is determined to be possible at step 200.

In one embodiment, internal dependencies are looked at first and a match is only discounted if one application chooses to externally export the same package whilst the other application chooses to import the package from outside of itself.

In the preferred embodiment, a match is only found when there is an import from one bundle and an export from another bundle with intersecting versions. This version information is gathered at steps 130 and 180. Other criteria are of course possible.

It should be appreciated that bundles may specify their dependencies in terms of either a straight version number or they may specify a range. As part of the matching process, it is preferably important to take account of version ranges, if they exist. The system preferably calculates whether a version lies within a range. For example, does export version 1.4 lie within import version range 1.0 to 1.5. This may be achieved using an algorithm which determines whether 1.4>=1.0 and 1.4<=1.5. If the result yields a value of TRUE then export version 1.4 does lie within the specified range.

Whilst installation in framework 1 has been determined not to be possible, performing the same processing against framework 2 will indicate that installation is possible. This is because application Z's internal exports are packages Q and T which are not required in any shape or form by application Y (which exports packages P and S). Also although there is an explicit external export (package U), application Z does not specify an internal import for package U. Note an explicit external import for package U by application Y or Z would be acceptable as mentioned above and because they both externally export package U. Also application Y internally exports packages P and S which are not required in any shape or form by application Z.

It should be appreciated that whilst the invention has been described in terms of the OSGi environment, the invention is not limited to such. The invention is applicable to any environment in which it is possible to run applications side by side where those applications may specify conflicting dependencies on each other. Additionally the terms framework and framework instance are used interchangeably throughout and simply mean an environment in which code modules (bundles in OSGi terminology) run and are isolated from things outside the environment.

The term "package" has also been used throughout this description and is intended to be a general term which encompasses any possible imports or exports defined by a code module. To list just a few, this may include services, schemas, models etc.

Additionally, as indicated above the implementation given has been provided for ease of explanation. There are various optimisations possible. For example, rather than analyse all imports and exports specified by application X (internally and externally) it would be possible to shorten the processing. Once a match had been located, no additional processing is necessary since installation is deemed not possible. In other words, it is not necessary to do a complete analysis of all applications in a framework. Of course, a match would not be identified if the application X chose to externally import or export the matched package whilst the opposite was true of application Z. This is in line with the detail provided above.

It would also be possible to cache the results of any dependency analysis performed during steps 110 and 125 for use subsequently; for example for use at step 160 and 175.

Whilst the dependency analysis has been described in terms of packages with version level constraints, other forms of constraint are equally possible; for example, attribute matching (e.g. mandatory attributes in OSGi).

It should be appreciated that whilst the solution has been described in terms of installation of a new application into an existing system, it would also be possible to use dependency analysis in order to determine a configuration of the system which helps minimise the number of framework instances.

The invention claimed is:

1. A method for deciding whether to install a first application within a candidate environment in a plurality of candidate environments, each candidate environment comprising one or more other applications, the method comprising:
    analyzing, by a processor, the first application and the candidate environment to determine whether there is a potential for the first application to interact in an unintended manner with each application of the one or more applications already installed in the candidate environment, wherein each application of the one or more applications are associated with one or more rules that specify at least one of:
    an entity that is to be used internally within the application;
    an entity that is provided by the application but may be used outside of the application; or
    an entity that is to be procured from outside of the application, and
    wherein the analyzing is performed by:
        determining, by the processor, whether an internal import defined by the first application matches an internal import or an internal export defined by each application of the one or more a applications already installed in the candidate environment, wherein a match determines there is potential for an unintended interaction; and
    responsive to determining that there is no potential for the unintended interaction, identifying, by the processor, the candidate environment as a suitable environment into which to install the first application, and
    wherein the unintended interaction is when a rule in the one or more rules would be broken by an interaction between the first application and the application of one or more applications already installed in the candidate environment.

2. The method of claim 1, wherein the analyzing of the first application and each application of the one or more applications already installed the candidate environment comprises:
    identifying, by the processor, if any, the import or an export defined by the first application; and identifying, by the processor, if any, the import or the export defined by each application of the one or more applications already installed in the candidate environment.

3. The method of claim 1, further comprising:
determining, by the processor, that there is the potential for the unintended interaction; and
responsive to determining that there is the potential for the unintended interaction, analyzing, by the processor, another candidate environment in the plurality of candidate environments to determine whether there is the potential for the first application to interact in an unintended manner with each application of one or more applications already installed in the other candidate environment, by:
determining, by the processor, whether the import defined by the first application matches an import or an export defined by each application of the one or more applications already installed in the other candidate environment.

4. The method of claim 3, wherein determining that there is the potential for the unintended interaction comprises:
analyzing, by the processor, at least a part of the first application and at least a part of at least one application in the one or more other applications in the candidate environment.

5. The method of claim 3, wherein analyzing another candidate environment comprises:
analyzing, by the processor, at least a part of each application in the one or more applications already installed within the other candidate environment.

6. The method of claim 5, further comprising:
responsive to determining that there is no potential for the unintended interaction between the first application and any application in the one or more other applications in the other candidate environment, identifying, by the processor, the other candidate environment as the suitable environment into which to install the first application.

7. The method of claim 3, further comprising:
responsive to having analyzed all candidate environments in the plurality of candidate environments without having identified a candidate environment in which there is no potential for the first application to interact in the unintended manner with any of the one or more applications in the plurality of candidate environments, creating, by the processor, a new environment; and
installing, by the processor, the first application in the new environment.

8. The method of claim 3, wherein analyzing each application of the one or more applications already installed in the other candidate environment comprises:
identifying, by the processor, if any, the import or the export defined by each application of the one or more applications already installed within the other candidate environment.

9. The method of claim 1, wherein an application specifies one or more criteria with respect to at least one of:
any entities that are to be used within the application;
any entities that are provided by the application but may be used outside of that application; or
any entities that are to be procured from outside of the application.

10. The method of claim 9, wherein the application specifies a certain version or version range for an entity.

11. The method of claim 1, comprising:
caching, by the processor, information with respect to analysis performed.

12. The method of claim 1, comprises:
responsive to identifying the candidate environment as the suitable environment into which to install the first application, installing, by the processor, the first application therein.

13. Apparatus for deciding whether to install a first application within a candidate environment in a plurality of candidate environments, an environment comprising one or more other applications, the apparatus comprising:
a processor; and
a memory coupled to the processor, wherein the memory comprises instructions which, when executed by the processor, cause the processor to:
analyze the first application and the candidate environment to determine whether there is a potential for the first application to interact in an unintended manner with each application of the one or more applications already installed in the candidate environment, wherein each application of the one or more applications are associated with one or more rules that specify at least one of:
an entity that is to be used internally within the application;
an entity that is provided by the application but may be used outside of the application; or
an entity that is to be procured from outside of the application, and
wherein the analyzing is performed by:
determining whether an internal import defined by the first application matches an internal import or an internal export defined by each application of the one or more a applications already installed in the candidate environment, wherein a match determines there is potential for an unintended interaction; and
responsive to determining that there is no potential for the unintended interaction, identify the candidate environment as a suitable environment into which to install the first application, and
wherein the unintended interaction is when a rule in the one or more rules would be broken by an interaction between the first application and the application of one or more applications already installed in the candidate environment.

14. The apparatus of claim 13, wherein the instructions to analyze the first application and each application of the one or more applications already installed the candidate environment further causes the processor to:
identify, if any, the import or an export defined by the first application; and
identify, if any, the import or the export defined by each application of the one or more applications already installed in the candidate environment.

15. The apparatus of claim 13, wherein the instructions further cause the processor to:
determine that there is the potential for the unintended interaction; and
responsive to determining that there is the potential for the unintended interaction, analyze another candidate environment in the plurality of candidate environments to determine whether there is the potential for the first application to interact in an unintended manner with each application of one or more applications already installed in the other candidate environment, by:
determining whether the import defined by the first application matches an import or an export defined by each application of the one or more applications already installed in the other candidate environment.

16. The apparatus of claim 15, wherein the instructions for determining that there is the potential for the unintended interaction further causes the processor to:
analyze at least a part of the first application and at least a part of at least one application in the one or more other applications in the candidate environment.

17. The apparatus of claim 15, wherein the instructions for analyzing another candidate environment further causes the processor to:
analyze at least a part of each application in the one or more applications already installed within the other candidate environment.

18. The apparatus of claim 17, wherein the instructions further cause the processor to:
responsive to determining that there is no potential for the unintended interaction between the first application and any application in the one or more other applications in the other candidate environment, identify the other candidate environment as the suitable environment into which to install the first application.

19. The apparatus of claim 15, wherein the instructions further cause the processor to:
responsive to having analyzed all candidate environments in the plurality of candidate environments without having identified a candidate environment in which there is no potential for the first application to interact in the unintended manner with any of the one or more applications in the plurality of candidate environments, create a new environment; and
install the first application in the new environment.

20. The apparatus of claim 15, wherein the instructions for analyzing each application of the one or more applications already installed in the other candidate environment further causes the processor to:
identify, if any, the import or the export defined by each application of the one or more applications already installed within the other candidate environment.

21. The apparatus of claim 13, wherein an application specifies one or more criteria with respect to at least one of:
any entities that are to be used within the application;
any entities that are provided by the application but may be used outside of that application; or
any entities that are to be procured from outside of the application.

22. The apparatus of claim 21, wherein the application specifies a certain version or version range for an entity.

23. The apparatus of claim 13, comprising:
cache information with respect to analysis performed.

24. The apparatus of claim 13, comprising:
responsive to identifying the candidate environment as the suitable environment into which to install the first application, install the first application therein.

25. A computer program product comprising a non-transitory computer readable storage medium having a computer readable program for deciding whether to install a first application within a candidate environment in a plurality of candidate environments, an environment comprising one or more other applications stored therein, wherein the computer readable program, when executed on a computing device, causes the computing device to:
analyze the first application and the candidate environment to determine whether there is a potential for the first application to interact in an unintended manner with each application of the one or more applications already installed in the candidate environment, wherein each application of the one or more applications are associated with one or more rules that specify at least one of:
an entity that is to be used internally within the application;
an entity that is provided by the application but may be used outside of the application; or
an entity that is to be procured from outside of the application, and
wherein the analyzing is performed by:
determining whether an internal import defined by the first application matches an internal import or an internal export defined by each application of the one or more a applications already installed in the candidate environment, wherein a match determines there is potential for an unintended interaction; and
responsive to determining that there is no potential for the unintended interaction, identify the candidate environment as a suitable environment into which to install the first application, and
wherein the unintended interaction is when a rule in the one or more rules would be broken by an interaction between the first application and the application of one or more applications already in the candidate environment.

\* \* \* \* \*